US007851388B2

(12) United States Patent
Kim et al.

(10) Patent No.: US 7,851,388 B2
(45) Date of Patent: Dec. 14, 2010

(54) LEAD PELLET RECOVERY FABRICS

(75) Inventors: Yong Ku Kim, Dartmouth, MA (US); Armand Francis Lewis, Mattapoisett, MA (US)

(73) Assignee: University of Massachusetts, Shrewsbury, MA (US)

( * ) Notice: Subject to any disclaimer, the term of this patent is extended or adjusted under 35 U.S.C. 154(b) by 687 days.

(21) Appl. No.: 11/138,054

(22) Filed: May 26, 2005

(65) Prior Publication Data

US 2006/0270300 A1 Nov. 30, 2006

(51) Int. Cl.
*B32B 27/04* (2006.01)
*B32B 5/26* (2006.01)
*D04B 1/00* (2006.01)
*D04B 23/08* (2006.01)
*D04B 21/00* (2006.01)
*F41C 27/00* (2006.01)
*A63B 71/00* (2006.01)

(52) U.S. Cl. ............... 442/135; 442/304; 442/318; 66/192; 66/195; 42/106; 473/421

(58) Field of Classification Search .............. 442/304, 442/318; 26/21; 43/1; 66/192, 195
See application file for complete search history.

(56) References Cited

U.S. PATENT DOCUMENTS

| 4,677,013 | A | * | 6/1987 | Anderson | 428/116 |
| 5,073,441 | A | * | 12/1991 | Melec et al. | 442/1 |
| 5,569,273 | A | * | 10/1996 | Titone et al. | 606/151 |
| 6,627,562 | B1 | * | 9/2003 | Gehring, Jr. | 442/35 |
| 6,737,371 | B1 | * | 5/2004 | Planck et al. | 442/304 |
| 6,794,008 | B2 | * | 9/2004 | Wildeman | 428/89 |
| 2004/0176658 | A1 | * | 9/2004 | McMurray | 600/37 |
| 2005/0125147 | A1 | * | 6/2005 | Mueller | 701/209 |
| 2005/0215147 | A1 | * | 9/2005 | Masters et al. | 442/59 |

\* cited by examiner

*Primary Examiner*—Rena L Dye
*Assistant Examiner*—Jennifer Steele
(74) *Attorney, Agent, or Firm*—Lando & Anastasi, LLP

(57) ABSTRACT

The invention provides methods for finishing knitted fabrics and fabrics finished by the novel process. In one embodiment, the method of finishing a knitted fabric includes the steps of: (a) stretching the fabric above about 5% but less than about 25% in width, and above about (−)7% but less than about 10% in length, (b) heat-setting the fabric to the stretched width and length at a temperature above about 120 degrees Centigrade and lower than about 250 degrees Centigrade, and (c) applying a polymeric protective binder coating resin to the fabric at a concentration of at least 5% but less than 25% based on the weight of the fabric.

22 Claims, 9 Drawing Sheets

TYPE P (Pleated)

DIRECTION OF PELLET IMPACT

TYPE F (Folded)

DIRECTION OF PELLET IMPACT

TYPE VS (Vertical Slats)

DIRECTION OF PELLET IMPACT

DIRECTION OF PELLET IMPACT "NORMAL" TO PLANE OF THE PAGE

DIRECTION OF PELLET IMPACT
CONCAVE- MODE 100 102 106 104

30  31  32  33

LEAD PELLET RECOVERY FABRICS

BACKGROUND

Sportsmen and women face an important challenge from the environmental contamination by spent lead shot that accumulates on skeet and trap ranges and sporting clay courses and the like. Lead contamination is a persistent threat to wildlife, habitat and water quality and therefore causes a potential health hazard to humans. Consequently, this problem has garnered the attention of national sportsman organizations, arms and ammunition manufacturers, environmental professionals and concerned citizens. (See e.g., "Getting the Lead Out" by Donald Hanson, which was first posted on the website of the Massachusetts Department of Environmental Protection in March of 2000 at http://www.rangeinfo.org/resource library/facility mngmnt/environment/getting the lead.htm, attached hereto as Attachment A). There is therefore a need for technology for minimizing lead contamination from skeet and trap ranges and sporting clay courses.

SUMMARY

The invention provides fabrics for containing fired lead shot. Such fabrics can be hung on poles or other such devices as a back-drop or barrier at a shooting range or course. As a result of hitting the fabric, the lead shot pellet loses all or most of its kinetic energy and thus falls to the ground near the fabric. The spent shot can then be collected and recycled with overall minimal environmental impact. The improved functionality of these fabrics is made possible by novel repeat unit sizes and textile fabric finishing methods that are disclosed herein.

In one embodiment, the invention provides methods of treating a knitted fabric. The knitted fabric is treated by: (a) stretching the fabric above about 5% but less than about 25% in width, and above about (−)7% to about (+)10% in length (b) heat-setting the fabric to the stretched width and length at a temperature above about 120 degrees Centigrade and lower than about 250 degrees Centigrade, and (c) applying a polymeric resin to the fabric In a preferred embodiment, the lengthwise stretch is above about 1% and below about 7%. The skilled artisan will understand that negative stretching is shrinkage.

Preferably, the polymeric resin is applied to the knitted fabric at a coating weight above about 5% and below about 25% of the weight of the knitted fabric. The polymeric resin is preferably applied at a coating weight between about 10% and about 20% of the weight of the knitted fabric. In another preferred embodiment, the knitted fabric is stretched between about 10% and about 20% in width. The knitted fabric is heat set at between about 160 and about 220 degrees Centigrade in another embodiment. The preferred knitted fabric for these methods has fibers defined by the following criteria: a tenacity of about 1 to about 10 grams per denier, a breaking elongation of from about 6% to about 40%, and a modulus between about 20 and about 130 grams per denier. Most preferably, the knitted fabric has a repeat unit having a wale direction spacing length of between about 1.2 mm and about 2.2 mm and a course direction spacing length of between about 1.3 mm and about 2.0 mm after the length and width stretching of the fabric. The invention provides knitted fabrics treated by each of these methods. The invention further provides a curtain comprising the knitted fabric (treated by one of the above methods) in louvered, folded or pleated segments. Also provided, is a double layer fabric assembly having a first layer made of the knitted fabric, and a second layer that is made of an unfinished mesh fabric (i.e., having multiple holes). The second layer is knitted or woven. In use, the first layer is positioned behind the second layer (i.e., farther away from the firing position(s) than the second layer).

The holes are each an approximate rectangle. The approximate rectangle has two sets of approximately parallel sides. The side of the first set are each between about 0.8 mm and about 2.1 mm, and the sides of the second set are each between about 1.0 mm and about 3.8 mm. In another embodiment, the sides of the first set are each between about 1.8 mm and about 2.2 mm, and the sides of the second set are each between about 2.3 mm and about 3.8 mm. The assembly further includes a structure for maintaining the first layer and the second layer approximately parallel to each other and separated by at least 0.5 inch measured between one edge of said first layer and one edge of the second layer. The front mesh layer is preferably open during use (i.e., the pellet has to pass through only one layer of the mesh fabric).

In another embodiment, the invention provides a finishing method applicable to so-called "high performance fabrics" having fibers that fit the following criteria: tenacity (specific breaking strength) of 11-35 g/d, breaking elongation below 5%, and modulus of 300-4600 g/d. Examples of such fibers include polyaramid nylon, polyaromatic polyester, and high tenacity polyethylene. The method includes the step of applying a polymeric resin finish to the "high performance" knitted fabric. Preferably, the polymeric resin is applied at a coating weight above about 5% and below about 25% of the weight of the knitted fabric, and most preferably at a coating weight between about 10% and about 20% of the weight of the knitted fabric. Knitted fabrics finished according to each of these finishing methods are also provided. Further provided are curtains having these knitted fabrics in louvered, folded or pleated configurations. The invention further provides a double layer assembly having a first-layer having the knitted fabric layer prepared from yarns of the "high performance" fibers (finished according to any of these methods), a second layer having an unfinished mesh fabric, and a means for maintaining the first layer and the second layer approximately parallel to each other and separated by at least 0.5 inch measured between one edge of the said first layer and one edge of said second layer. The mesh fabric may be knitted or woven. In use, the second layer is positioned in front of the first layer, and closer to the firing position(s).

The mesh fabric has multiple holes that are approximate rectangles. In one embodiment, the approximate rectangle has two sets of sides, the sides within a set being approximately parallel to each other. The sides of the first set are each between about 0.8 mm and about 2.1 mm, and the sides of the second set are each between about 1.0 mm and about 3.8 mm. In another embodiment, the sides of the first set are each between about 1.8 mm and about 2.2 mm, and the sides of the second set are each between about 2.3 mm and about 3.8 mm. In use, the first layer is positioned behind the second layer (i.e., farther away from the firing position(s) than the second layer).

The invention further provides a knitted fabric having a repeat unit having a wale direction spacing length of between about 1.1 mm and about 2.5 mm and a course direction spacing length of between about 1.2 mm and about 2.1 mm and a polymeric resin finish applied to said knitted fabric. Preferably, the repeat unit has between about 1.2 mm and about 2.2 mm in wale direction spacing and between about 1.3 mm and about 2.0 mm in course direction spacing. The polymeric resin finish is applied at a coating weight above about 5% and below about 25% of the weight of the knitted fabric, and more preferably at a coating weight between about 10% and about 20% of the weight of the knitted fabric.

Warp knitted fabrics are preferred in all embodiments. The skilled artisan will understand that the technical face of the fabric should be positioned to face the impacting pellets when in use.

FIGURES

PRESENTLY PREFERRED EMBODIMENTS OF THE INVENTION

Definitions

Figure 1:
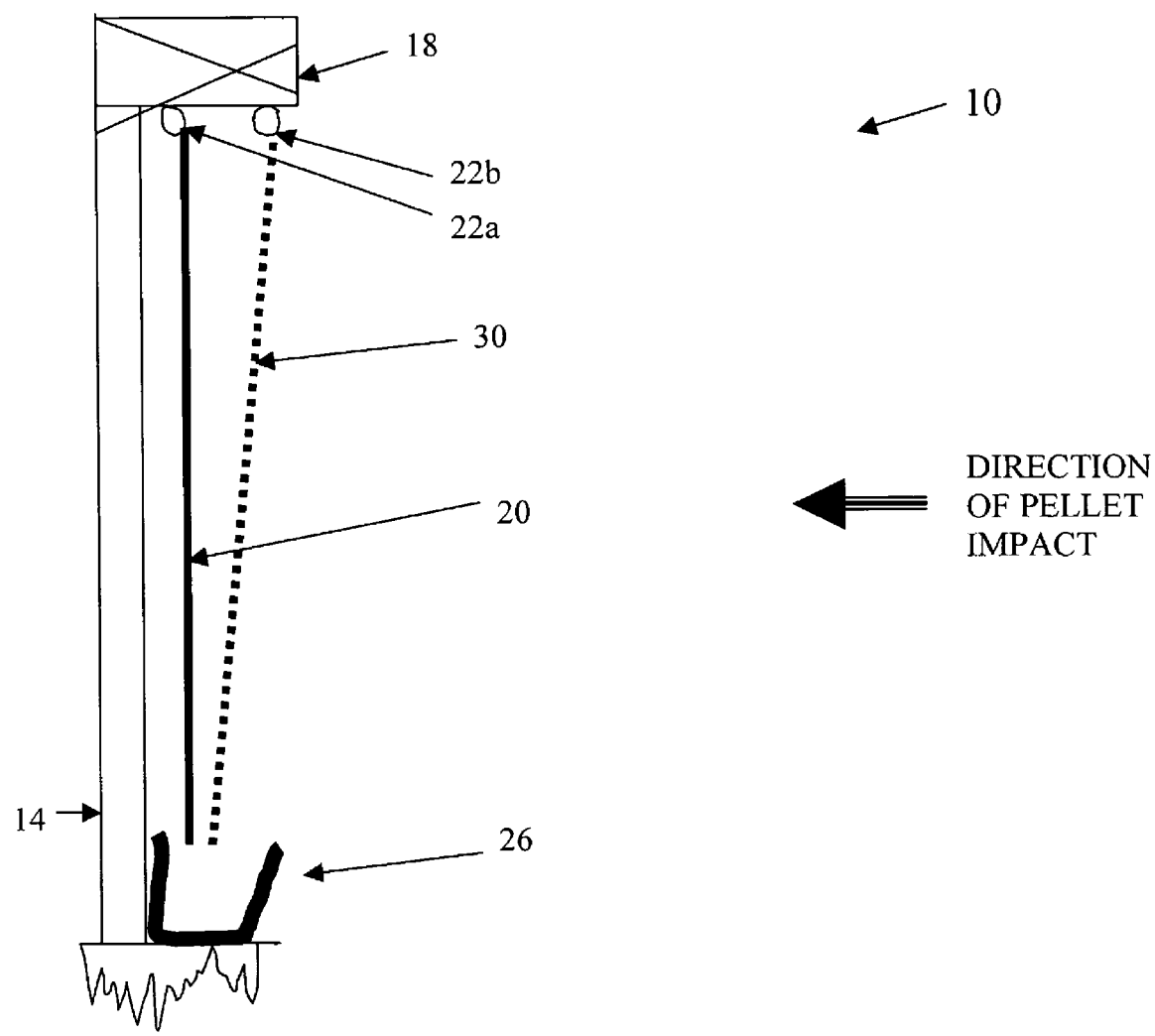
FIG. 1 illustrates a side view of a double curtain assembly.

The term "polymeric resin" as used herein refers to a polymeric protective resilient resin, and preferably a finishing material that is commonly applied to fabrics to "coat over", impregnate and stabilize the knit pattern made by the fiber filaments in the yarns. The purpose of applying the finishing resin to the fabric is to bind or adhere the individual fibers in the yarns of the fabric together. This applied polymeric resin serves to stabilize and protect the fabric from abrasion. Under this bound condition, the kinetic energy (stress) of the impacting pellet can be distributed or transmitted over a larger area of the yarn and fabric because the fabric now exists as a "unitary" and geometrically "stabilized" network. The binding and consolidation of the yarns and warp knit fabric pattern with a resin binder eliminates the possibility of having the single pellet inducing a damaging "point impact" strike on the filaments. With the resin finish bound fabric, the pellet's kinetic energy is distributed over much more of the fabric's surface area. Examples of resins suitable for use in various embodiments of the invention include finishes based on acrylic, melamine, styrene-butadiene rubber and polyurethane based resins. The more flexible resins, like the acrylic, styrene-butadiene and polyurethane based polymeric resins are preferred over more brittle types. Polymeric resins are routinely sold as water based emulsions (or water solutions) by a number of companies, such as Organic Dyestuffs (East Providence, R.I.), Clariant Corp. (Charlotte, N.C.) and Eastern Color & Chemical Company (Providence, R.I.). Prior to application, these water based resin formulations are commonly combined with other chemicals such as pH adjusters, surfactants, pigments, catalysts and other formulating agents. Solvent-based flexible resin finishes are also included in this definition. However, solvent-based textile finishes are presently, rarely used commercially because of their higher cost and their accompanying environmental (solvent evaporation problem) drawbacks. Overall, the finishing resins should be prepared according to the manufacturer's instructions for knitted fabrics and applied in accordance with the invention herein. Manufacturing instructions should be followed for curing the finishing resins. The following phrases are used interchangeably with "polymeric resin": "resin", "binding resin", "polymeric protective binding resin", "polymeric binding resin finish", "polymeric resin", "polymeric finishing resin", "polymeric resin finish", and "finishing resin".

"G/d" as used herein means grams per denier.

As used herein, the term "length" refers to the machine direction. In warp knitting, the direction of the "wale lines" is the machine direction. The "bulk" (off the roll) fabric length is much longer than the fabric width.

The term "width" as used herein, refers to the direction perpendicular to the machine direction. In warp knitting, the direction of the "course lines" is the width or the direction perpendicular to the machine direction.

Presently Preferred Embodiments

The invention provides novel methods of finishing a knitted fabric, and novel finished knitted fabrics. The knitted fabrics are preferably warp knit. It further provides assemblies and curtains that include the novel knitted fabrics.

Knitted fabrics are well known to the skilled artisan. Similarly, the skilled artisan is well familiar with finishing techniques and technologies that are routinely applied to such fabrics. Many resources are available on this topic, including A. R. Horrocks, S. C. Anand (editors), "Handbook of Technical Textiles", Woodhead Publishing (2000) and Philip E. Slade, "Handbook of Fiber Finish Technology", Marcel Dekker, New York, N.Y. (1998). Both of these are herein incorporated by reference in their entirety.

The invention provides finishing methods that can be applied to a knitted fabric. As an example, the methods can be applied to a fabric that is fabricated on a warp knitter equipped with the following settings: Number of guide bars=3 to 8 bars of full and/or partial set; Number of needle bars=1 (one); Lapping movement: closed/open overlaps together with underlaps with 1-5 needle spaces including laying-in; Courses per inch=15 to 25; Wales per inch=15 to 25; Fabric weight=150-400 gram per square meter. Examples of preferred stitches include tricot, locknit, reverse locknit, chain, inlay, shark skin stitches and queenscord. The preferred fabrics are knitted using synthetic filament yarns of 200-500 (yarn) denier on the said warp knitter with full and/or partial set guide bars. The fabrics produced have selvedges formed with separate selvedge guide bars. In a most preferred embodiment, the warp knitted fabric is made from polyester or nylon yarns. Generally, however, any warp knitted fabric derived from synthetic fibers can be used within the context of the invention.

Additionally, the skilled artisan is well familiar with what are hereby referred to as "regular" textile fabrics fabrics. As used herein, a "regular textile" fabric has fibers that fit within the following criteria: tenacity of about 1- about 10 grams per denier, breaking elongation of about 6%- about 40%, and modulus of about 20- about 130 grams per denier. Examples of such fabrics include: cotton, wool, viscose, acrylic, nylon, and polyester. Synthetic fibers are preferred within the context of this invention.

The invention provides a novel method of finishing a "regular" textile knitted fabric as defined above. In one embodiment, the method includes the steps of: (a) stretching the fabric above about 5% but less than about 25% in width, and above about −7% (shrinking) but less than about 10% in length, preferably the length stretch should be above about 1% and below about 7% (b) heat-setting the fabric to the stretched width and length at a temperature above about 120 degrees Centigrade and lower than about 250 degrees Centigrade; and (c) applying a polymeric finishing resin to the already heat set fabric. The polymeric resin is applied at a coating weight between above about 5% and below about 25% of the weight of the knitted fabric. Preferably, the coating weight is between about 10% and about 20% of the weight of the knitted fabric. A preferred heat setting temperature is between about 160 and about 220 degrees Centigrade. The skilled artisan is well familiar with the machinery that can be used to practice this invention. For example, a tenter frame can be used to stretch and heat set the fabric. A padder, kiss roll or knife coater can be used to apply the polymeric resin to the fabric.

Polyester fibers/yarns are preferred for outdoor use since they are durable to weathering and UV radiation in comparison to other synthetic fibers.

The temperature for heat-set and for finish application depends upon the type of fiber material being processed. Some temperature requirements for processing specific fiber materials are outlined below.

| Fiber Type | Heat-Set |
|---|---|
| Nylons | |
| Nylon 6,6 | 170° C. to 190° C. |
| Nylon 6 | 160° C. to 180° C. |
| Polyesters | |
| PolyEthylene Terephthalate (PET) | 180° C. to 190° C. |
| PolyButyl Terephthalate, (PBT) | 190° C. to 220° C. |

The polymeric resin finish is applied at room temperature or higher (usually in the range of 20 to 40 degrees Centigrade) depending on the application instructions for the particular resin. The polymeric finishing resin is then cured at a temperature that is no more than 80 degrees Centigrade lower than the fabric's heat set temperature. Examples of preferred curing temperatures are:

| Fiber Type | Finish Application |
|---|---|
| PET | 105 to 125° C. |
| Nylon 6/6 | 105 to 125° C. |

Curing temperatures should be chosen based on the resin manufacturer's instructions for the resin.

The skilled artisan is also familiar with "high performance fibers". These meet the following requirements: tenacity (specific breaking strength) of 11-35 g/d, breaking elongation below 5%, and modulus of 300-4600 g/d. Examples of high performance fabrics having such fibers include: polyaramid nylon (e.g., Kevlar®), polyaromatic polyester (e.g., Vectran®), high tenacity polyethylene, and polyolefins (e.g., Spectra®).

Figure 8:
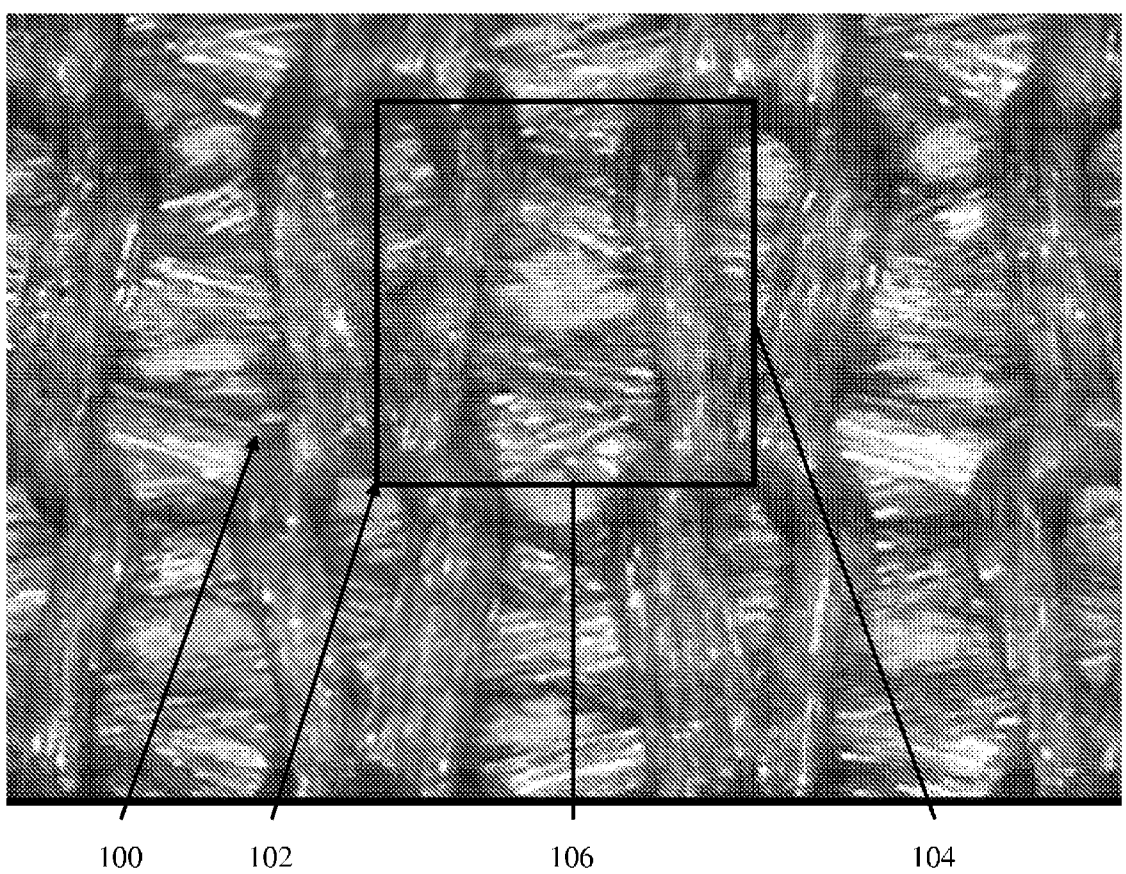
FIG. 8 illustrates a repeat unit of an embodiment of a knitted fabric.

In certain embodiments, as illustrated in FIG. 8, the knitted fabric 100 has a repeat unit 102 having a wale direction spacing length 104 of between about 1.2 mm and about 2.2 mm and a course direction spacing length 106 of between about 1.3 mm and about 2.0 mm after the length and width stretching of the fabric.

The high performance fibers such as polyaramid Kevlar® and Nomex® and aromatic-polyesters Vectra® or Vectran® are made from so-called "liquid crystal polymers" (LCPs). Fibers derived from these LCPs are relatively quite rigid and contain aromatic groups. For fabrics warp-knitted using these high performance fibers/yarns, the heat set process of the fabrics does not apply. The temperature resistance of this class of fibers is very high. With these high performance fabrics, the repeat unit size must be designed into the fabric such that when a final polymeric "setting or protective finish" is applied to the fabric, the repeat unit size is within the limits designated in this invention.

With these high performance fabrics, the invention provides a method including applying a polymeric resin to a knitted high performance fabric to set the repeat unit dimensions in the fabric. Preferably, the polymeric resin is applied at a thin to moderately thick coating weight. In one embodiment, the polymeric resin is applied at a coating weight above about 5% and below about 25% of the weight of the knitted fabric. In another embodiment, it is applied at a coating weight between about 10% and about 20% of the weight of the knitted fabric.

As described above, the methods of the invention are used to finish knitted fabrics. Thus, the invention provides knitted fabrics finished according to the methods described herein.

In another embodiment, the invention provides a double curtain assembly. The thought is that if the pellets are allowed to hit an open mesh "screen" first and pass through the mesh, their impact energy will be partly spent when striking this front layer of open mesh. If a space is imparted between this "front" mesh fabric and the "back" barrier fabric, the pellets that pass through the front (more open) mesh will strike the "back" barrier fabric without damaging the "back" fabric. Then, the "spent" pellets, with reduced "bounce-back" will fall by gravity between the two layers of fabric. A trough can then be placed under the "slot" between the fabrics to collect the pellets directly. The spent lead pellets can then be "harvested" from the bottom trough and then sold to the recycling agency.

Referring to FIG. 1, the double curtain assembly 10 includes a first (back) fabric 20 that is finished according to a method of the invention. Assembly 10 includes a mesh fabric 30. The front fabric 30 must have no finish—i.e., the knit fabric loops and inter-laced overlaps must remain loose and flexible so that the yarns or filament strands open up and slide past each other to allow a fired lead shot pellet to penetrate, distort and pass between them and then through the fabric.

The front mesh fabric is warp knit or woven. For example, it could be made from a monofilament polyolefin, nylon or polyester fiber material. This front fabric layer must have a mesh hole size to allow the lead pellet to pass through the fabric with little or no damage to the fabric. In a most preferred embodiment, it is a knit fabric like Polymax® black, monofilament polyethylene mesh fabrics obtained from Tek-Supply, Dyersville, Iowa 52040.

Figure 9:
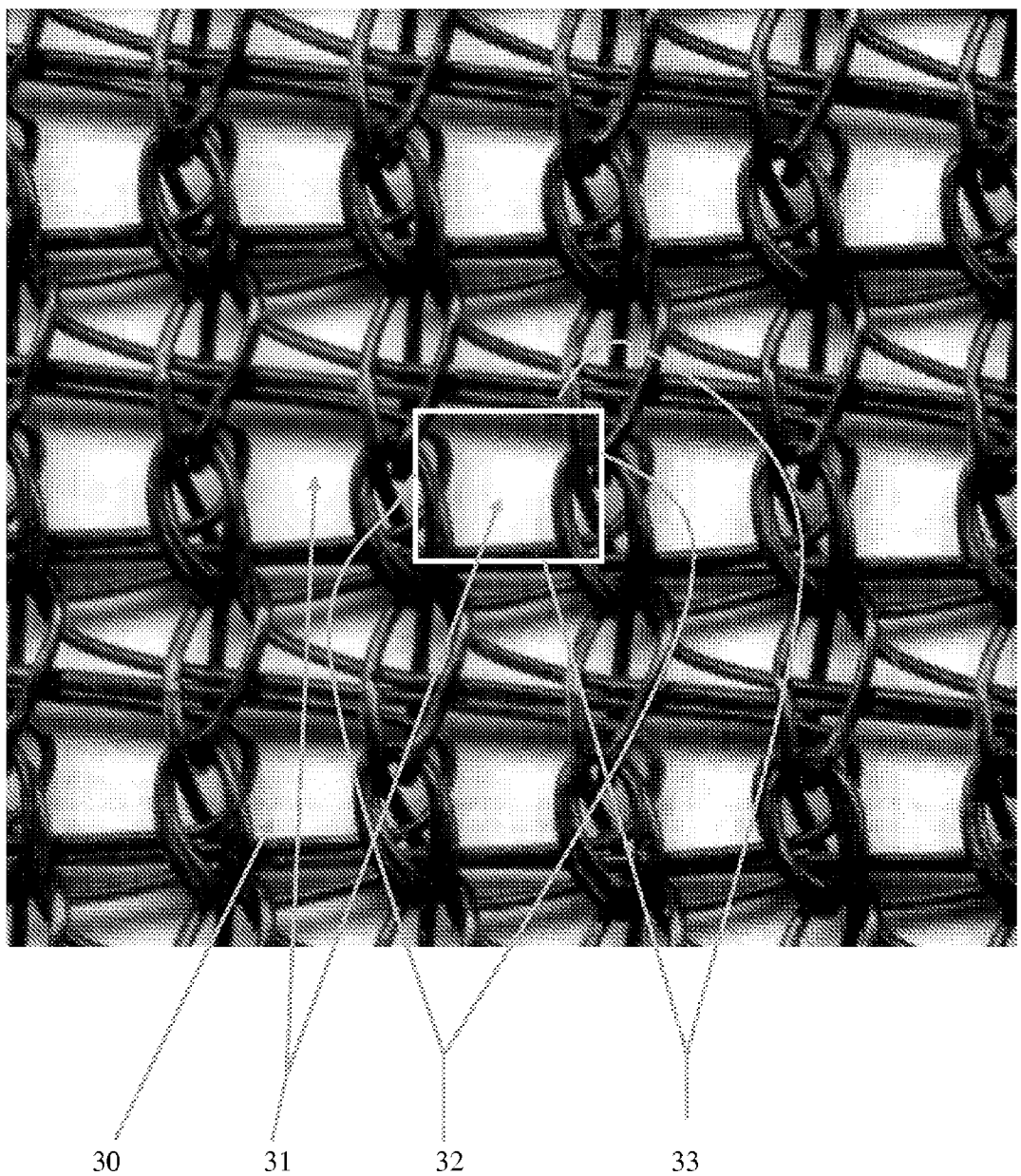
FIG. 9 illustrates an embodiment of a mesh fabric.

The mesh fabric has multiple holes that are approximate rectangles. In one embodiment, illustrated in FIG. 9, the mesh fabric 30 includes multiple holes 31 that are approximate rectangles. The approximate rectangle has two sets of sides 32 and 33, the sides within a set being approximately parallel to each other. The sides 32 of the first set are each between about 0.8 mm and about 2.1 mm, and the sides 33 of the second set are each between about 1.0 mm and about 3.8 mm. In another embodiment, the sides of the first set are each between about 1.8 mm and about 2.2 mm, and the sides of the second set are each between about 2.3 mm and about 3.8 mm. In use, the first layer is positioned behind the second layer (i.e., farther away from the firing position(s) than the second layer).

Fabric 30 and fabric 20 are hung with a beveled space between the two fabrics as shown in FIG. 1. They are tethered together at the bottom of each fabric at a desired distance apart from each other. They are hung with a larger space between the fabrics on top (i.e., measured at the height of attachment of the fabrics to support 18) than at the bottom between the fabrics (measured at the height where the fabrics are tethered to each other). Trough 26 captures pellets as they drop.

Assembly 10 can take on any configuration that would accomplish the above requirements. In one embodiment, it includes pole 14 that supports a box truss support structure 18. Attachment 22a attaches fabric 20 to support 18, and attachment 22b attaches fabric 30 to support 18. Attachments 22a and 22b can be any standard attachment used to connect a curtain or fabric to a support (e.g., a curtain-rod boom arrangement and rings attached to the support that fit through folded openings in the fabric, clips attached to the support, etc.). The skilled artisan will understand that fabrics 20 and 30 extend out in the direction that is perpendicular to the flat face of the page. In other words, they are hung so that the side of the fabrics with the greatest surface area is positioned to make it most likely that pellets will hit or pass through fabric 30 followed by the lead pellet being stopped by impacting fabric 20. Thus, multiple attachments are preferably used to attach the approximate top of each fabric to support 18.

Figure 2:
FIG. 2 illustrates a pleated fabric (top viewed looking down on the fabric edge).
Figure 2:
Figure 3:
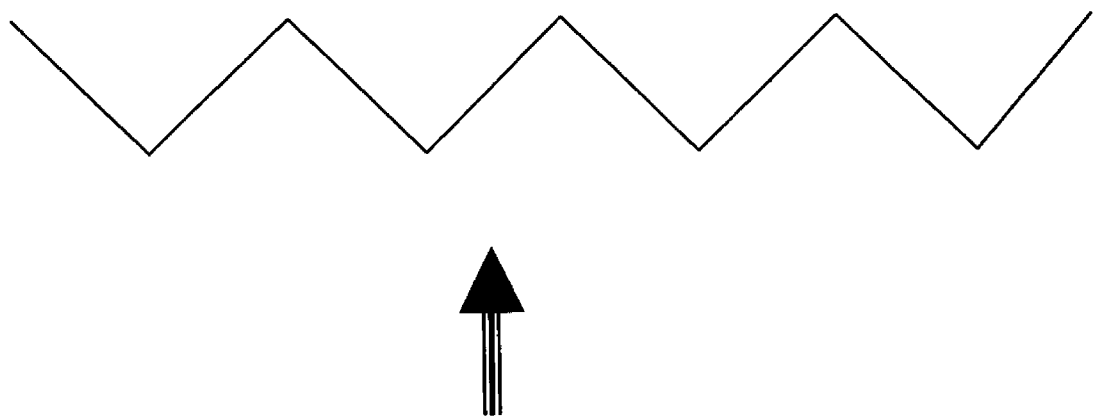
FIG. 3 illustrates a folded fabric (top viewed looking down on the fabric edge).
Figure 4:
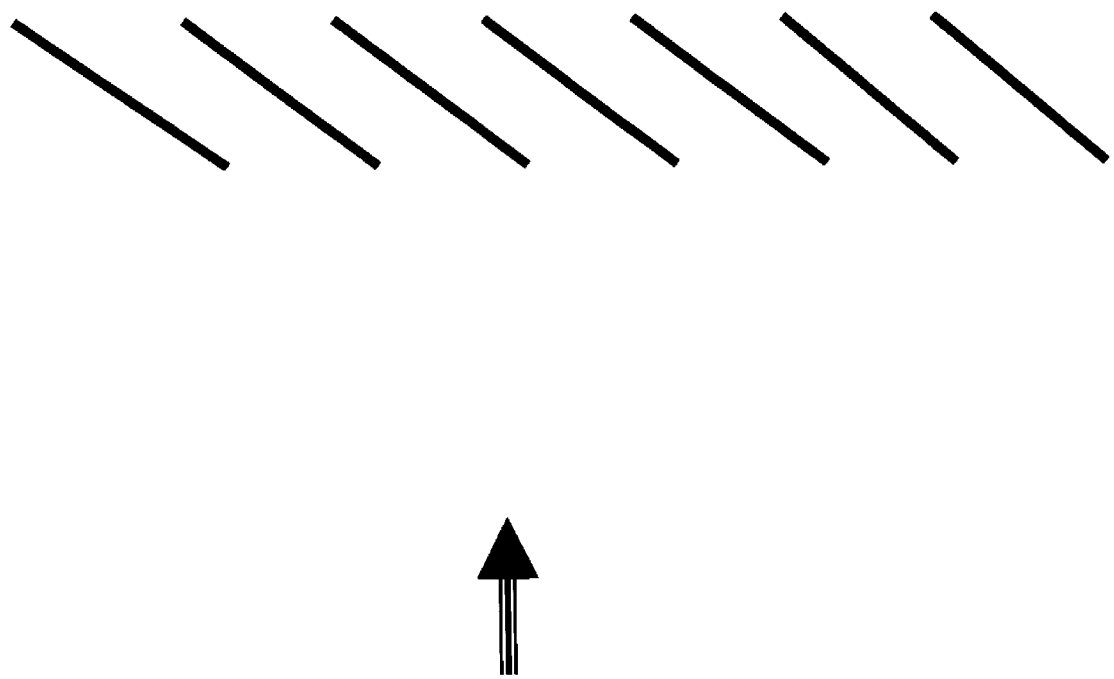
FIG. 4 illustrates vertical slats of a fabric (top viewed looking down on the fabric slat edges).

The invention further provides pleated, folded and louvered fabric configurations. Top views are shown in FIGS. 2, 3, and 4, respectively. These fabrics are finished according to a method of the invention, and then placed in the appropriate configuration. The idea is that the pellets will hit the fabric at primarily a glancing angle, dissipate some kinetic energy and thus have lower pellet bounce back off the barrier curtain characteristics Pleated and folded fabrics are created by pleating or folding a fabric finished according to the invention. The pleats or folds are then "set" by ironing the fabric. Preferably, the ironing conditions should be at a temperature that is sufficient to soften and heat set the fabric to the folded condition. Of importance, however the ironing process should be rapid so as to not thermally degrade the resin applied during the finishing process. Alternately, the folds or pleats can be sewn or knitted by a design pattern into the shape of a fold or pleat. For the sewing process, the pleats or folds can be held in place by sewing them in place with a needle and thread. The fabrics may be framed, hung, or otherwise supported by any of a number of means, such as frames, poles, curtain rods, and other similar assemblies. Pleats and folds in these fabrics are essentially similar in shape. The size of a fold or pleat can run from about 1½" per fold (designated as a "Pleat") to about 6" per fold (designated as a "Fold") as measured from peak to trough. The exact distinction between a fold and pleat is not important since any fold or pleat between about 1.5 and about 6 inches (or more) (as measured from trough to peak) will work within the context of the invention. From an end view perspective as designated by FIGS. 2 and 3, the pleats or folds can be, for example, isosceles triangle in shape with the distance between the points on the triangle approaching an equilateral triangle.

FIG. 4 illustrates an example of a vertically louvered curtain assembly. This configuration employs vertical slats of the lead shot curtain fabric assembled into the form of a "vertical blind" type window treatment assembly. The slot angles of this vertical slot assembly can be adjusted similar to what is done in standard window treatment apparatuses. To be effective in stopping the impacting pellets, the slat angle should be less than 45 degrees from the fully "closed position. Here the lead pellets can strike the curtain slats at a glancing angle, dissipate its kinetic energy and fall to the ground. In this configuration, slat widths can be any nominal size from about 5 cm to over 20 cm.

In another louvered curtain configuration, the louvered "slats" are made of individual, metal boom supported curtains that are hung next to each other in a slanted and "underlapped" array. These individual curtains (slat louvers) can be of any convenient width such as 8 to 10 feet wide. The length of these individual curtain "louvers" can be from about 25 feet to over 35 feet in length. In an installed curtain assembly, these individual louvered curtains are "under-lapped" and slanted adjacent to each other at an angle of about 10 to 30 degrees from being "closed" so as to provide a slight glancing angle of impact for the impacting lead pellets and providing a slot for the wind to more easily pass through the curtain assemble serving to reduce the total wind load on the assembled lead shot barrier curtain structural support system.

Figure 5:
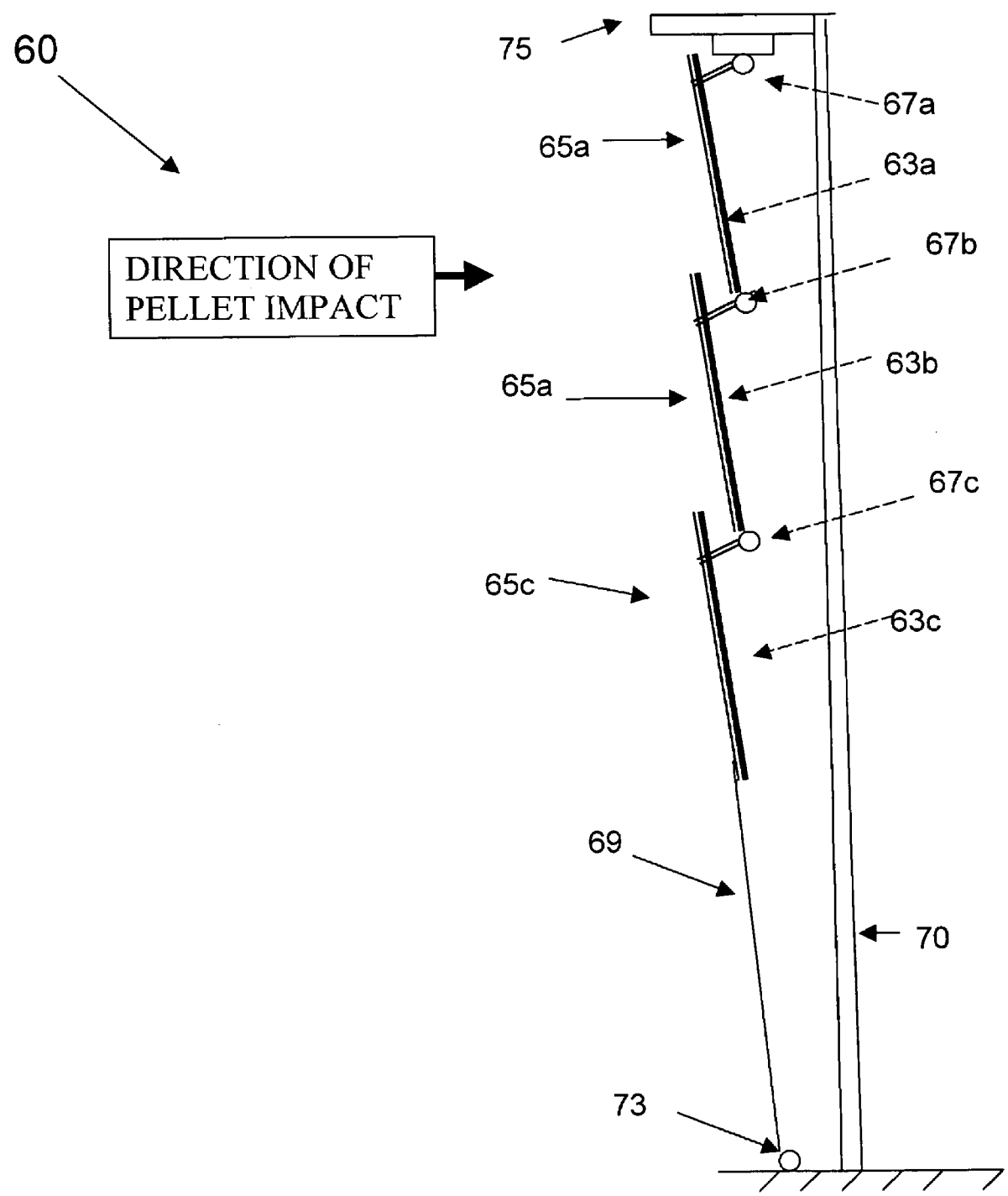
FIG. 5 illustrates a side view of a louvered assembly.

FIG. 5 illustrates an example of a horizontally louvered assembly 60 of a fabric finished according to the invention. The side-by-side placement of panels (holding fabrics finished according to the invention) is accomplished by offsetting the position of the adjacent panels. Preferably, the assembly 60 is further fitted with pulleys and lines so panels can be easily lowered and raised.

Referring again to FIG. 5, pole 70 supports truss 75, and thus provides the backbone for the assembly 60. Top panel 63a supports fabric 65a. Offset support brace 67a is attached to the approximate top of panel 63a by nail(s), nuts and bolts, screw(s) or other similar fastening devices. It is further attached to truss 75, similarly by nail(s), nuts and bolts, screw(s) or other similar fastening devices well known to the skilled artisan. Middle panel 63b similarly supports fabric 65b, and is attached to offset support brace 67b. Offset support brace is attached to the approximate bottom of top panel 63a. Finally, bottom panel 63c supports fabric 65c. An offset brace attaches the approximate top of panel 63c to the approximate bottom of middle panel 63b. The skilled artisan will understand that a smaller or larger number of panels will be appropriate based on the application.

Figure 6:
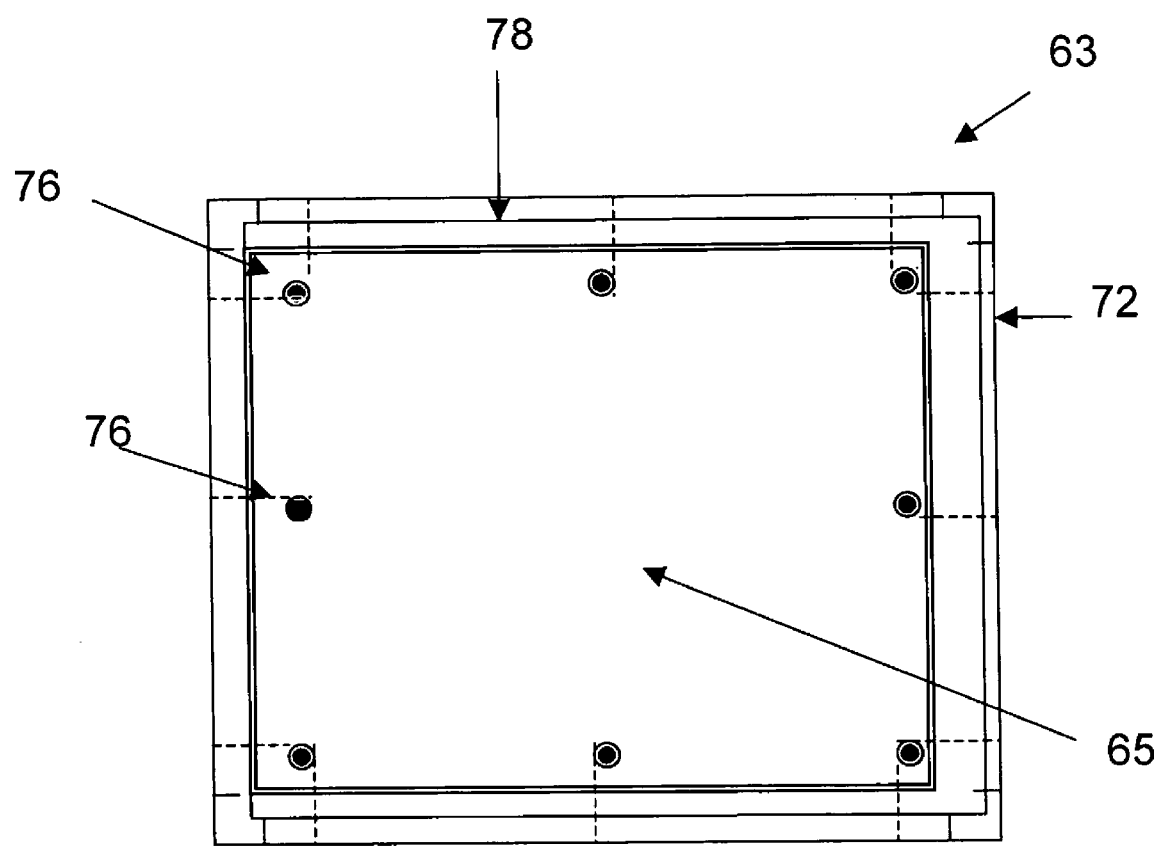
FIG. 6 illustrates a fabric panel mounted in a supporting frame.

Fabric panels can be constructed in any of a number of ways to hold the fabric. They should preferably be positioned so that the side of the panel exposing the greatest amount of fabric surface area is perpendicular to or normal to the line of fire from a shotgun's lead pellets. For example, framed fabric can be constructed as described in Example 6, below, steps 1-8. FIG. 6 illustrates an example of a panel that can be used within the context of the invention and that was constructed as described in Example 6, below. Panel 63 includes a PVC pipe, fiber glass reinforced composite structural tube or metal pipe frame 72. Fabric 65 has grommets 76. Cable ties (shown as dashed lines) connect frame 72 to fabric 65 through the grommets 76. Empty space 78 is visible between fabric 65 and frame 72.

Referring again to FIG. 5, a tether line 69 attaches the approximate bottom of the lowest panel (i.e, panel 63c) to a weight or anchor 73 on the ground or bottom of assembly 60, and thus prevents this bottom panel 63c from being blown about by wind or the force of pellet impact.

All vertical and horizontal "louvered" lead shot curtain configurations have the advantage of having the reduced wind load feature. This is important in the installation, deployment and functioning of these physical structures.

The invention having now been described, embodiments are illustrated in the examples below, which are not intended to be further limiting. The contents of all cited patents and papers referred are hereby incorporated by reference herein.

EXAMPLE 1

Preparation of Polymeric Resin Mixture of ECCO Resin 610 for Application to Fabric A polymeric resin sold under the trade name ECCO resin 610 was prepared for application by mixing with other ingredients as follows into a 60 gallon tank:
- 28.6 gallons water
- 23.2 gallons Ecco Resin 610—polymeric binder
- 3.0 gallons Ammonium Hydroxide (28%)—pH adjustment
- 1.2 gallons Antimigrant WW (ECCO product)—prevent pigment migration
- 0.6 gallons Eccowet LF Conc.—wetting agent, surfactant
- 0.2 gallons Ecco Black—pigment The ammonium hydroxide is used to adjust the pH of the final finishing bath to a pH of 9.0.

All of the above items (except water) are available from Eastern Color and Chemical Company (Providence, R.I.) under the listed trade names. Eastern Color and Chemical describes ECCO RESIN 610 as follows: a modified anionic acrylic copolymer resin, water based emulsion with self-crosslinking properties. It is a water (laundering) durable finish that has superior stability to heat and light. Moderately flexible to the "hand". Applies well to nylon and polyester fibers and blends of these textiles.

The skilled artisan will understand that pigment is not generally required as part of the finish. Pigments may be added for aesthetic (color) purposes or to increase the weatherability of a fabric since certain color pigments can block out some of the damaging UV radiation.

EXAMPLE 2

Preparation of ECCO REZ M-300-NEW Resin Mixture for Application to Fabrics

A finishing resin sold under the trade name ECCO REZ M-300-NEW (Eastern Color and Chemical, Providence, R.I.) is described by the seller as a modified melamine-formaldehyde in water solution. Melamine resin is an Aromatic Triamine Thermosetting polymer. It is used for "hand building", crease and wrinkle resistance, shrinkage control, structural stiffness and resilience. Good light and water resistance. Applies well to nylon fabrics to give a "stiff" hand to warp knit fabric. Apply finish up to 12% (or lower) of weight of fabric loading. It was prepared for application according to the application by mixing in a 55 gallon tank the following proportions for the finishing of "regular" nylon knit fabrics:
- 208 lbs Ecco Rez M-300-NEW
- 4 lbs. Di-Ammonium Phosphate (catalyst)
- Mix to 50 gallons total with water.

EXAMPLE 3

Finishing of "Regular" Fabrics

A. Stretching and Heat Setting

The fabric is first bidirectionally stretched. This "heat setting" process is carried out on a textile processing machine called a tenter-frame. On the entrance end of this machine, the edges of a roll of fabric are hooked onto pins that serve to spread the fabric at its nominal width. The leading edge of the fabric span is also secured so the fabric is pulled through the machine. With the fabric being held at its edges, the tenter-frame machine then proceeds to continuously move the "pinned-at-the-edges" fabric through a controlled temperature heating oven, while maintaining 5-7% machine direction (length) stretch (bi-directional stretch). The temperature of the oven is set to 180° C. to 220° C. depending on the fabric used. Under this heating in the oven zone, the fabric's width can be mechanically adjusted so as to cause a widening or stretching of the "pinned-at-the-edges" fabric. The degree or percentage of widening of the fabric's width can be adjusted during the operation and then fixed to a pre-arranged percent of stretch. Continuing the process, this "Stretched" or "Physically Widened" fabric then passes through a temperature cooling zone while the fabric is still in its stretched condition. As the fabric cools, the stretched or widened condition of the fabric is "locked in" or "set" into the fabric. This fabric is now "heat set" and at the exit end of the tenter-frame machine is wrapped into a roll for further processing. This "heat set" fabric will remain in this stretched condition indefinitely if the fabric is not exposed to temperatures equal to or higher than the temperature at which the fabric was originally heat set. Due to the high temperatures required for fabric "heat setting", a resin finish cannot be applied simultaneously in connection with a multi-heating zone tenter-frame. Resin finishes are usually applied below 100 degree C. temperature. However, the curing of resinous finishes can be carried out for short times at slightly higher temperatures. If resinous finish chemicals are exposed to high temperatures, a poor quality of finish results due to thermal degradation.

B. Preparation of Resin

A polymeric resin is prepared for application as per manufacturer's instructions. Exemplary polymeric resin mixtures are illustrated, above, in Examples 1 and 2.

C. Application of Resin

The heat set fabric is first fed through an immersion tank containing the finish material (above formula). The fabric is then placed on a tenter-frame and is smoothed out to about 10% during the passing of the fabric at a speed of 20 yards per minute through the tenter-frame. The tenter-frame has 4 air temperature zones that are set at about 80 to 110° C. Under these tenter-frame (fabric moving) oven conditions, the fabric temperature is set at above 110° C. to affect the cure of the finishing resin. The finishing resin such as ECCO RESIN-610 is cured at a minimum temperature of 132° C. for 3 (three) minutes. Note that the speed that the fabric passes through the tenter-frame's ovens controls the temperature that the fabric attains the resin curing temperature 132° C.

EXAMPLE 4

Preparation of Finished Fabrics Designated HG 200A, 200XB, 200X, 100X-2A and 100X-4B Fabrics designated HG 200A, 200XB, 200X, 100X-2A and 100X-4B were manufactured and finished by Hope Global Corporation (Cumberland, R.I.) under directions provided by the inventors.

These fabrics were manufactured on a 36 gauge (18 needles per inch), Raschel Warp Knitting Machine manufactured by Kidde Textile Machinery Co (Company is no longer in business). Warp knitting settings and conditions for the nylon and polyester yarns were as follows:

Knitting Machine Settings for All Fabrics
Pattern Chain Motion:
- BAR 1 2-0/4-6
- BAR 2 4-6/2-0
- BAR 3 8-10/2-0
- BAR 4 2-0/8-10
- BAR 5 0-0/4-4

Guide Bar 1 2, 3 and 4 are ½ set, while Bar 5 is knitting ½ inch selvedge on each side of the fabric. Take-up rate: 16.4 courses per inch.

Nylon warp knitted fabrics were manufactured using: Semi-Dull Nylon 66 yarns (200 denier/34 filaments), 4.7 grams/denier tenacity and about 45% elongation at break.

Polyester warp knitted fabrics were manufactured using: Natural polyester (poly(ethylene terephthalate) yarns (250 denier/48 filaments), 4.9 grams/denier Tenacity, about 35% Elongation at break, 7.2% hot-air yarn shrinkage (as supplied by vendor).

The fabrics were finished according to the procedures described in Example 3 and as further specified below in Table 1.

6. We stamped ⅜" hole diameter grommets at each corner of the fabric square and at the approximate mid-point of each side.

7. We fabricated a polyvinyl chloride (PVC—Schedule 40) pipe frame from four (4) five foot lengths of 1" PVC (plastic water pipe). We then bonded 90 degree elbows to each of the four five foot lengths of 1" pipe. PVC primer and then pipe cement was used to secure the 90 degree elbows to the 1" PVC pipe. The final frame assembly was finished by laying the pipes and elbows on a flat surface (i.e., the floor) and applying cement to keep the elbows and PVC pipes in place. All items were purchased at a Home Depot hardware store.

8. The fabric was attached to the frames by securing it with 7" to 8" long black (UV stabilized) cable ties through the

TABLE 1

Hope Global (HG) fabric characteristics

| Sample Designation | Areal Density g/m² | Heat Set(a) Temp. C.° | Final H.S. Stretch Conditions (width) | Final H.S. Stretch Conditions (length) | % Finish/ Cure Temp. C.° | Starting Fabric | Repeat unit size(b) (mm) |
|---|---|---|---|---|---|---|---|
| NYLON | | | | | | | |
| H/G 100X-2A | 238 | No H.S. | Unstretched | Unstretched | No finish | Nylon Base | 1.4 × 1.4 |
| H/G 100X-4B* | 186 | 180 | 13% | 1% | 10% owf/120 | H/G 100XA | 1.2 × 1.7 |
| POLYESTER | | | | | | | |
| H/G 200A | 266 | No H.S. | Unstretched | Unstretched | No finish | PET Base | 1.6 × 1.6 |
| H/G 200XB** | 190 | 200 | 12% | 4% | 12% owf/120 | H/G 200A | 1.5 × 1.8 |
| H/G 200X** | 226 | 180 | 10% | 4% | 16% owf/132 | H/G 200A | 1.5 × 1.7 |

(a)H.S. = Heat Set, owf = % is based on weight of the fabric.
(b)Knit pattern repeat unit size presented in terms of wale direction spacing length × course direction spacing length.
*Melamine Finish Used - ECCO-REZ M-300 NEW Resin Formulation (stiff hand) mixture prepared as described in Example 2.
**Acrylic Finish Used - ECCO RESIN 610 (moderate hand) mixture prepared as described in Example 1.

EXAMPLE 5

Prophetic Example of Finishing High Performance Fabric

A high performance fabric is finished as described in Example 3 except that it is not pre-stretched or heat set (i.e., begin from section "B" of Example 3)

EXAMPLE 6

Testing Procedure—Lead Shot Ballistic Test

Warp-knit fabrics were obtained from various sources for controlled field testing. In this regard, a test procedure for ballistically evaluating these test fabrics was developed and is described in detail below.

We prepared fabric test squares from each of the fabrics described below as follows:

1. We marked a 59¼" square on the fabric sample.
2. We then marked a 3" wider border around the 59¼" square
3. We made a 1½" wide double fold on the perimeter or each side of the fabric so a final 59¼" square, with a 1½" border, was produced.
4. The folded fabric border was stabilized with a hot iron (i.e., a common household iron) for the purpose of making it easier to sew a hem on the perimeter.
5. A stitch was sewn around the inner part of the fold using an industrial grade sewing machine and a strong polyester fiber thread.

fabric's grommets to the PVC frame. Attempt was made to not tie the cable ties too tightly, i.e., to keep tension on the fabric to a minimum. Cable ties were subsequently checked after each shot since cable ties often break when they are directly impacted by lead pellets.

9. The framed fabric was mounted on a wooden frame positioned perpendicular to or "normal" to the line of fire. The position/location of this sample mounting was marked as ZERO target distance. We made sure that the technical "front" side of the fabric was facing out (toward the firing gun).

10. We placed light tan colored cardboard on the ground in front of the target and in the "bins" under the support frame so that the count of lead shot bounce-back could be assessed. This cardboard was about 6 to 8 feet wide and extended out to about 10 feet from the target. In certain tests, the "bin" behind the test fabric sample was also lined with cardboard so the number of pellets falling behind the test fabric could be counted. After the cardboard became frayed after repeated experimentation, we replaced it with white nonwoven fabric.

11. We marked distance positions on a "straight line" from the target frame.

12. We loaded 12 gauge, 2¾" length, HDCP, 1235 feet/second velocity, 1⅛" oz. lead shot, 7½ shot STS12NH7 (Remington Arms Company, Madison, N.C.) ammunition into the shotgun. This 7½ type of ammunition imparts a higher than average kinetic energy onto the pellets in the ammunition casing as compared to more "standard" intensity shells that are used at trap and skeet shooting fields.

13. From a sitting position, we fired a total of five (5) shots at each single specific 5 ft.×5 ft. fabric (target) being tested.

14. After each of the five shots, we assessed the "damage" made to the fabric.

15. We next removed, the fabric and it's PVC frame from the wooden mount for a "quantitative" laboratory inspection and counting.

16. In the laboratory, we counted the total number of pellet hits on the fabric. This included all hits, strikes, dents, fiber breakage and pellet through penetration. We designated this as total hits ("TH"). Counting the total number of pellet hits was aided by the light gray (lead colored) "smear" that stained the fabric when the lead pellet hit the fabric. This caused a point "smudge" on the fabric surface that facilitated the counting. This lead smudge was also accompanied by a slight dent in the fabric.

17. We counted, among these total hits, the number of these "hits" where the fibers became damaged (i.e., broken yarn, pellet holes, pellet capture etc.) We designated this count as "DH" (for Damaging Hits). This DH count also included the penetration hits, "PH". Counting the DH is more easily done by inspecting the "back side" of the fabric visually and also by feeling/touching the fabric rather than through a visual inspection.

18. We next counted the number of hits where complete penetration of the lead pellet occurred. We designated this as "TP" (for Total Penetration hits).

19. From the measured TH and DH data for each fabric, we calculated the percent (%) of Damaging Hits based on the total number of hits or strikes on the fabric, or, $$\% \text{ Damaging Hits}(\%DH) = \frac{DH \times 100}{TH}$$

or, $$\% \text{ Non-Damaging Hits}(\%NDH) = \frac{[TH - DH] \times 100}{TH}$$

20. We obtained these data on a fabric at various shooting distances and found the shooting distance where the % of Non-Damaging Hits is 100% (or the % of Damaging Hits is Zero—no damaging hits occur).

Results of these tests are presented in Table 2, below:

TABLE 2

Evaluation Of Fabrics For Lead Shot Barrier Curtains

| Fabric[1] | Areal Density (Grams/Meter$^2$) | Shooting Distance (Yards) | Total Number of Hits (Number per Target Area$^3$) | Hits Causing Damage (Number per Target Area$^3$) | Percent Non-Damage Causing Hits |
|---|---|---|---|---|---|
| Nylon-MSHR 59813 (Silver, warp knit) | 234 | 100 | NA | 0 | 100 |
|  |  | 85 | 594 | 43 | 93 |
|  |  | 75 | 884 | 91 | 90 |
| Polyester-MSHR 584F (White, warp knit) | 150 | 100 | 62 | 1 | 99 |
|  |  | 85 | 186 | 31 | 84 |
|  |  | 75 | 340 | 92 | 73 |
| Nylon-MSHR675F (Black, warp knit) | 436 | 100 | 576 | 0 | 100 |
|  |  | 75 | 915 | 0 | 100 |
|  |  | 65 | 982 | 14 | 98 |
|  |  | 50 | 1258 | 102 | 92 |
|  |  | 25 | 970 | 276 | 72 |
|  |  | 10 | 830$^4$ | 830$^4$ | 0 |
| "TRAP NET" (Green woven) | 417 | 100 | 84 | 2 | 98 |
|  |  | 85 | 240 | 16 | 93 |
|  |  | 75 | 215 | 135 | 37 |
|  |  | 65 | 493 | 385 | 22 |
| Hope Global 100X-2A (Nylon Warp knit- no finish) | 238 | 100 | 253 | 32 | 87 |
| Hope Global 100X-4B (same as 100X-2A above but with resin finish) | 186 | 100 | NA | 0 | 100 |
|  |  | 85 | 67 | 0 | 100 |
|  |  | 75 | 163 | 18 | 89 |

[1]Fabrics:
[A]. Nylon-MSHR 59813, 66" wide Silver, 100% Bright Nylon, 234 g/m$^2$ (Gehring Textiles, Garden City, NY). The fabrics from Gehring Textiles were chosen from small (Swatch) hand samples sent to us by the vendor. We were looking for nylon and polyester based fabric warp-knits. We were also looking for heavier weight fabrics among the "hand" samples supplied to us. We chose the "Black", "Silver" and "White" fabrics described in footnotes 1(A), 1(B) and 1(C), herein, for our initial ballistic trials.
[B] Polyester-MSHR 584F, 88" wide, White, 100% PET, 150 g/m$^2$ (Gehring Textiles Garden City, NY)
[C] Nylon-MSHR675F, 43" wide, Black, 100% Nylon, 436 g/m$^2$ (Gehring Textiles, Garden City, NY)
[D] "Trap-Net" - 60" wide, green vinyl (PVC) coated Nylon yarn, 10 picks/inch, 15 (double) ends/inch, Plain Weave. Material obtained from Hammar & Sons Sign Company, Pelham, NH 03076. This fabric is commercially available and is included in this Table for comparison.
[E] See Example 4 for descriptions of Hope Global fabrics.
[2]Areal Density decreases because fabric was stretched (expanded) during finishing. The fibers are therefore in a "pre-stressed" state in the final heat set and finished fabric form.
[3]Target area is 59¼" by 59¼" (2.71 sq. yds.)
[4]About a 1½" hole blown through center of fabric.

Test criteria are based on determining the fabrics that are not damaged by firing a "round" of 5 shots from a "standard" 12 gauge Shot Gun load at 100 yards. The results presented in Table 2, however, relate to the Percent on Non-Damaging Hits on the fabric at various shooting distances. The shorter the distance from the firing shotgun to the target that results in 100% Non-Damaging Hits, the better the fabric is in ballistic containment of and not being permanently damaged by lead shot pellets.

The data show that the only test fabrics that passed the 100 yard shooting distance test were the nylon knit (silver), the nylon knit (black) and the Hope/Global 100X-4B nylon knit fabrics. The only fabric to pass the 75 yard range was the nylon knit (black). At a distance of 65 yards, damaging hits were observed on all fabrics tested. The White Polyester and the "Trap-Net" both showed only a few damaging hits at 100 yards. Even with a few damaging hits at 100 yards, this observed performance must be considered unsatisfactory. This was the result of 5 (five) shots. The observed damage is permanent and this accumulates with the number of "Shots" fired at it. This behavior is indicative of a short term in-field endurance life for these fabrics. Overall, analysis of the data in Table 1 show that the best fabric for ballistic durability is the Black Nylon warp knit obtained from Gehring Textiles Inc, New York, N.Y. (sample designation MSHR675F). No indication of fiber damage was observed even at 75 yards shooting distance. Furthermore, the Black nylon is warp knitted and unlike a woven fabric, will not unravel when damaged. This black nylon fabric had very poor "draping" properties. It was difficult to position as a free standing curtain and did not "hang" well. It was very "springy". Upon ballistic impact, the most seriously damaged test fabric was the "Trap-Net". This vinyl polymer coated onto nylon yarn and fused woven structure showed major yarn damage. The nylon core yarn is torn away from the vinyl polymer coating during the ballistic impact. "White" nylon yarns show through the back of the fabric barrier. Furthermore, white (natural color) nylon fibers are not resistant to weathering and UV radiation.

Referring to Table 2, the H/G unstretched and unfinished 100X-2A fabric has an areal density of 238 grams/meter sq., while the H/G stretched and finished 100X-4B fabric has an areal density of 186 grams/meter square area. In other words, the unstretched and unfinished fabric is stretched by an overall 33% to achieve the areal density of 186 grams/meter sq. of the stretched and finished fabric. Given the repeat unit size ranges (recited in Table 1 and on page 2) of the stretched and finished fabric of 1.2 mm×2.2 mm to 1.3 mm×2.0 mm, the unstretched and unfinished repeat units range from 1.56 mm$^2$ to 4.40 mm$^2$. A stretching of 33% results in the creation of an open area (e.g., a hole or pore) in the repeat unit that is 0.33×1.56 mm$^2$ to 0.33×4.40 mm$^2$, which is 0.51 mm$^2$ to 1.45 mm$^2$ of open area or pore size.

EXAMPLE 7

Testing of Finished Versus Unfinished Fabrics

The following table compares in-field lead shot test results that were conducted on untreated and treated PET and Nylon warp knitted fabrics. The fabrics were prepared and finished as described in Example 4, above. The shooting test procedure used is described in Example 6.

TABLE 3

Damage Hits observed in polyester and nylon warp knitted fabrics**

Table 3a: POLYESTER Warp Knitted Fabric

| Shooting Distance | 85 yards | 80 yards | 75 yards | 70 yards |
|---|---|---|---|---|
| Unfinished Fabric (H/G 200A) | 0 | 2 | 6 | — |
| Finished Fabric (H/G 200B) | — | 0 | 1 | 2 |
| Finished Fabric (H/G 200X) | — | 0 | 0 | 0 |

TABLE 3-continued

Damage Hits observed in polyester and nylon warp knitted fabrics**

Table 3b: NYLON Warp Knitted Fabric

| Shooting Distance | 100 yards | 85 yards | 80 yards | 75 yards |
|---|---|---|---|---|
| Unfinished Fabric H/G 100X-2A | 32 | — | — | — |
| Finished Fabric H/G 100X-4B | 0 | 0 | 0 | 18 |

**All the numbers in this Table refer to the number of Damaging Hits or DH

From these data it is clear that the heat-set, stretched and finished fabrics are superior to the unfinished fabrics. Note that the number of observed damage hits were for a 5 round volley of shots. For a 50 shot rounds one would expect there would be ten times the number of listed damage hits for 500 shot rounds the multiplication factor would be 100, and so on. At trap and skeet shooting fields, these fabrics will be subjected to thousands upon thousands of lead shot rounds. Therefore, preferably, a fabric will qualify at a specified shooting distance only if there is no (or zero) number of impact damage hits. Overall, the PET H/G 200B fabric was shot at for 30 rounds (at 80 yards) and the Nylon H/G 100X4B was shot at for 50 rounds (at 80 yards) without any observed fabric damage.

EXAMPLE 8

Bounce Back Experiments on Various Fabric Types

In this phase of the study, fabric (surface and geometrical) configurations were studied in an effort to control the lead shot "Bounce-Back" characteristics of the barrier. The experiment was carried out as described in Example 6 except to the extent described herein.

The overall success of these barrier fabrics is based on recovering a good percentage of the lead shot pellets after the shot has been fired. If distances of the lead pellet bounce-back off the target barrier fabric can be lessened or controlled, the capture of lead shot pellets will be more easily achieved. To serve as a baseline for the lead shot pellet bounce-back, we compiled bounce-back data on the Flat Fabric test samples presented in Table 2, above. These data were obtained by counting the lead shot pellet "debris" in front of the approximately 5 ft.×5 ft. fabric panel that was fired upon during the test described in Example 6, above. The lead shot pellets were counted in three zones directly in front of the panel covering a 6 foot width. Zone 1 was a 2 foot wide "bin" (with 12" high sides) directly at the foot (front) of the test fabric sample (i.e., spanning zero to 2 feet in front of the fabric). Zone 2 was 3 feet ahead of zone 1 (i.e., occupying the space between 2 feet and 5 feet in front of the fabric). Zone 3 was 3 feet from Zone 2 (i.e., occupying the space 5 feet to 8 feet in front of the fabric).

As seen from Table 4, below, the flat fabric with the best energy absorbing Bounce-Back characteristics is the Nylon (Silver). This is because the highest percentage of the pellets fell in Zone 1, nearest to the fabric. Compared to the nylon fabric, all the other fabrics showed a similar behavior. For the polyester and Trap-Net fabrics, the pellets fell somewhat evenly distributed between Zone 1 and the combined Zones 2 and 3.

Also, fewer total number of pellets were found in the designated "fall zone area" for the polyester and Trap-Net fabrics suggesting that many of the pellets bounced further away from the target zone and captured pellet counting area. Apparently, these pellets were scattered into the area surrounding the target.

TABLE 4

Lead Shot Pellet "Bounce-Back"/Capture Profile for Flat Fabric Configurations*

| Fabric Description | Shooting Distance (Yards) | Zone | Pellet Count in the Zone | Percent of Total Pellets in Zone |
|---|---|---|---|---|
| Nylon (Silver) | 85** | 1 | 253 | 63 |
| | | 2 | 106 | 26 |
| | | 3 | 41 | 11 |
| | 75** | 1 | 166 | 89 |
| | | 2 | 11 | 6 |
| | | 3 | 9 | 5 |
| Polyester (White) | 100** | 1 | 40 | 51 |
| | | 2 | 20 | 26 |
| | | 3 | 18 | 23 |
| | 85** | 1 | 54 | 34 |
| | | 2 | 53 | 33 |
| | | 3 | 53 | 33 |
| | 75** | 1 | 42 | 41 |
| | | 2 | 31 | 30 |
| | | 3 | 30 | 29 |
| Nylon (Black) | 75 | 1 | 7 | 29 |
| | | 2 | 11 | 46 |
| | | 3 | 6 | 25 |
| | 65** | 1 | 18 | 45 |
| | | 2 | 18 | 45 |
| | | 3 | 4 | 10 |
| "Trap-Net" | 100** | 1 | 29 | 55 |
| | | 2 | 16 | 30 |
| | | 3 | 8 | 15 |
| | 85** | 1 | 38 | 52 |
| | | 2 | 24 | 33 |
| | | 3 | 11 | 15 |
| | 75** | 1 | 26 | 45 |
| | | 2 | 24 | 41 |
| | | 3 | 8 | 14 |
| | 65** | 1 | 28 | 49 |
| | | 2 | 19 | 33 |
| | | 3 | 10 | 18 |

*See Table 2 (Example 6) for fabric descriptions.
**These fabric panels were permanently damaged during the test. They failed ballistically.

EXAMPLE 9

Bounce Back Studies on Various Fabric Configurations

In continued studies of lead shot bounce-back and capture, several fabric barrier configurations were constructed. They were:

Sample P (Pleated) (see FIG. 2 for top view of fabric)
Sample F (Folded) (see FIG. 3 for top view of fabric)
Sample VS (Vertical Slats "Louvered") (see FIG. 4 for top view of vertical slat fabric, and FIG. 5 for side view of horizontal slat fabric configuration)

The pleated and folded fabrics were constructed by ironing in the pleats and folds and then attaching them to a PVC frame as described in Example 6. The pleated and folded test samples were fabricated as follows: In order to fabricate a 60" wide by 60" long pleated or folded curtain design, we used a piece of fabric approximately 120" long and 60" wide. A 60" final wide (across—left to right) pleated fabric was prepared by ironing into the fabrics alternating (in and out) creases of 1½" wide sections or "pleats" into the fabric. Since each pleat in the end cross section of the fabric was an equilateral triangle, we needed 40 pleats to obtain a 60" (final width) span of fabric curtain. The 60" long (up and down) size in the curtain was be fixed by the width of the original starting fabric. To prepare a folded curtain structure, we again started off with a 120" long and 60" wide piece of fabric and as above, ironed 4" wide sections into the fabric. Since the end view cross-sectional shape of the folds would form equilateral triangles, we needed 15 such folds to have the curtain span the required 60".

The idea here is that when the pellets strike the fabric, the majority of the strikes will be against a "slanted" surface. Here, the striking pellets should: (1) hit the fabric (absorbing a portion of impact energy), then (2) slide at a slanted angle across the pleated, folded or slat surface (absorbing more impact energy) and finally striking the "interior" folds of the fabric again loosing the rest of its energy and then falling, by gravity, to the base area of the fabric. Lead pellet bounce-back should at a shorter distance. Lead shot capture and bounce-back tests were carried out on the fabric configurations presented above. The data are presented in Table 5, below. These data are to be compared with the data for the Flat Fabric samples presented in Table 4, above.

The invented lead shot fabric barrier materials have a higher degree of ballistic capture (or protection) than the prior art. Also, the "damage tolerance of the invented fabric configurations is also much greater than the prior art. The new pleated, louvered and folded lead shot barrier fabric configurations are much more adaptable to lead shot pellet capture than the "traditional" flat surface fabrics. The "bounce-back" of lead shot pellets off a flat fabric surface may be greater than 10 feet away from the front of the fabric surface. The pleated and louvered fabric barriers confine the pellets to the immediate front of the fabric making the lead pellets much easier to confine and capture.

Testing was performed as in Example 6 (steps 6-20).

TABLE 5

Lead Shot Pellet "Capture" Profiles for Special Fabric Configurations*

| Fabric Description | Shooting Distance (Yards) | Zone | Pellet Count in the Zone | Percent of Total Pellets in Zone |
|---|---|---|---|---|
| Polyester (White) Type P (Pleated) (1½" wide pleats) | 100 | 1 | 132 | 59 |
| | | 2 | 73 | 33 |
| | | 3 | 19 | 8 |
| | 85** | 1 | 167 | 54 |
| | | 2 | 95 | 31 |
| | | 3 | 47 | 15 |
| Nylon (Black) Type F (Folded) (4" wide folds) | 75 | 1 | 86 | 39 |
| | | 2 | 84 | 39 |
| | | 3 | 48 | 22 |
| | 65 | 1 | 222 | 53 |
| | | 2 | 131 | 32 |
| | | 3 | 64 | 15 |
| | 50** | 1 | 276 | 58 |
| | | 2 | 124 | 26 |
| | | 3 | 79 | 16 |
| Nylon (Black)(a) | 75 | Back Bin | 0 | Add to Zone #1 |
| Type VS (b) <10 degree Slats(b) Convex | | 1 | 67 | 31 |
| | | 2 | 103 | 47 |
| | | 3 | 48 | 22 |
| 35 degree Slats | 75 | Back Bin | 26 | Add to Zone #1 |
| Convex | | 1 | 134 | 50 |
| | | 2 | 104 | 32 |
| | | 3 | 57 | 18 |
| 45 degree Slats | 75 | Back Bin | 37 | Add to Zone #1 |

TABLE 5-continued

Lead Shot Pellet "Capture" Profiles
for Special Fabric Configurations*

| Fabric Description | Shooting Distance (Yards) | Zone | Pellet Count in the Zone | Percent of Total Pellets in Zone |
|---|---|---|---|---|
| Convex | | 1 | 65 | 49 |
| | | 2 | 82 | 39 |
| | | 3 | 26 | 12 |
| Nylon (Black)(a) | 75 | Back Bin | 32 | Add to Zone #1 |
| Type VS (b) | | 1 | 121 | 77 |
| 35 degree Slats | | 2 | 37 | 19 |
| Concave | | 3 | 9 | 4 |
| 35 degree Slats | 65 | Back Bin | 48 | Add to Zone #1 |
| Concave | | 1 | 133 | 69 |
| | | 2 | 49 | 19 |
| | | 3 | 33 | 12 |

**See Table 2 (Example 6) for fabric descriptions.
(a)Since Type VS (louvered) panels have openings (albeit slanted) between the slats, captured pellets were counted in a bin in behind the fabric panel
(b) Here the Vertical Slats (louvers) are closed against each other to approach the conditions of a "Flat" fabric surface. The vertical slats on this panel were about 6 inches wide. The skilled artisan will understand that wider or narrower slats may be used within the scope of the invention.
**These fabric panels were damaged during the test.

Data have been compiled in Table 6 to compare the effect of slanted fabric surfaces of the TYPE P and F fabrics on pellet collection. First, comparing these data with the flat panel fabric damage data in Table 4, we see that the "shaped" fabric panels have a higher ballistic impact resistance (shorter shooting distance to cause fabric damage). The bounce back data also show a decrease in pellet bounce-back distances for these TYPE P and F fabrics surfaces compared to the "FLAT" fabric surfaces. In all cases, the percent pellets landing closer to the fabric (Zone 1) is clearly higher for the "shaped" fabric surfaces compared to the flat surface. Note however that none of these bounce-back values are as good as the flat (damage prone) Nylon (Silver) fabric presented in Table 2.

TABLE 6

Comparison of Pellet Bounce-Back Profiles of Flat vs. Type P
and Type F Fabric Configurations (data from Tables 4 and 5)

| Fabric Description | Shooting Distance (Yards) | Zone | FLAT Percent Total Pellets in Zone | TYPE | SHAPED Percent Total Pellets in Zone |
|---|---|---|---|---|---|
| Polyester (White) | 100 | 1 | 51 | P | 59 |
| | | 2 | 26 | P | 33 |
| | | 3 | 23 | P | 8 |
| | 85 | 1 | 34 | P | 54 |
| | | 2 | 33 | P | 31 |
| | | 3 | 33 | P | 15 |
| Nylon (Black) | 75 | 1 | 29 | F | 39 |
| | | 2 | 46 | F | 39 |
| | | 3 | 25 | F | 22 |
| | 65 | 1 | 45 | F | 53 |
| | | 2 | 45 | F | 32 |
| | | 3 | 10 | F | 15 |

As presented in Table 5, the Nylon (Black) TYPE VS barrier (louver) configuration was treated differently from the TYPES P and F configurations. This is because the TYPE VS panel is an "open" structure. It is like a vertical blind. Its level of open-ness depends upon the slat angle. Consequently, pellets can be collected behind as well as in front of the test panel. Here Zone 1 of the test was expanded to include the 3 foot wide pellet collection bin behind the fabric. Therefore, for the TYPE VS panel, several tests were performed at different slat angles.

Figure 7:
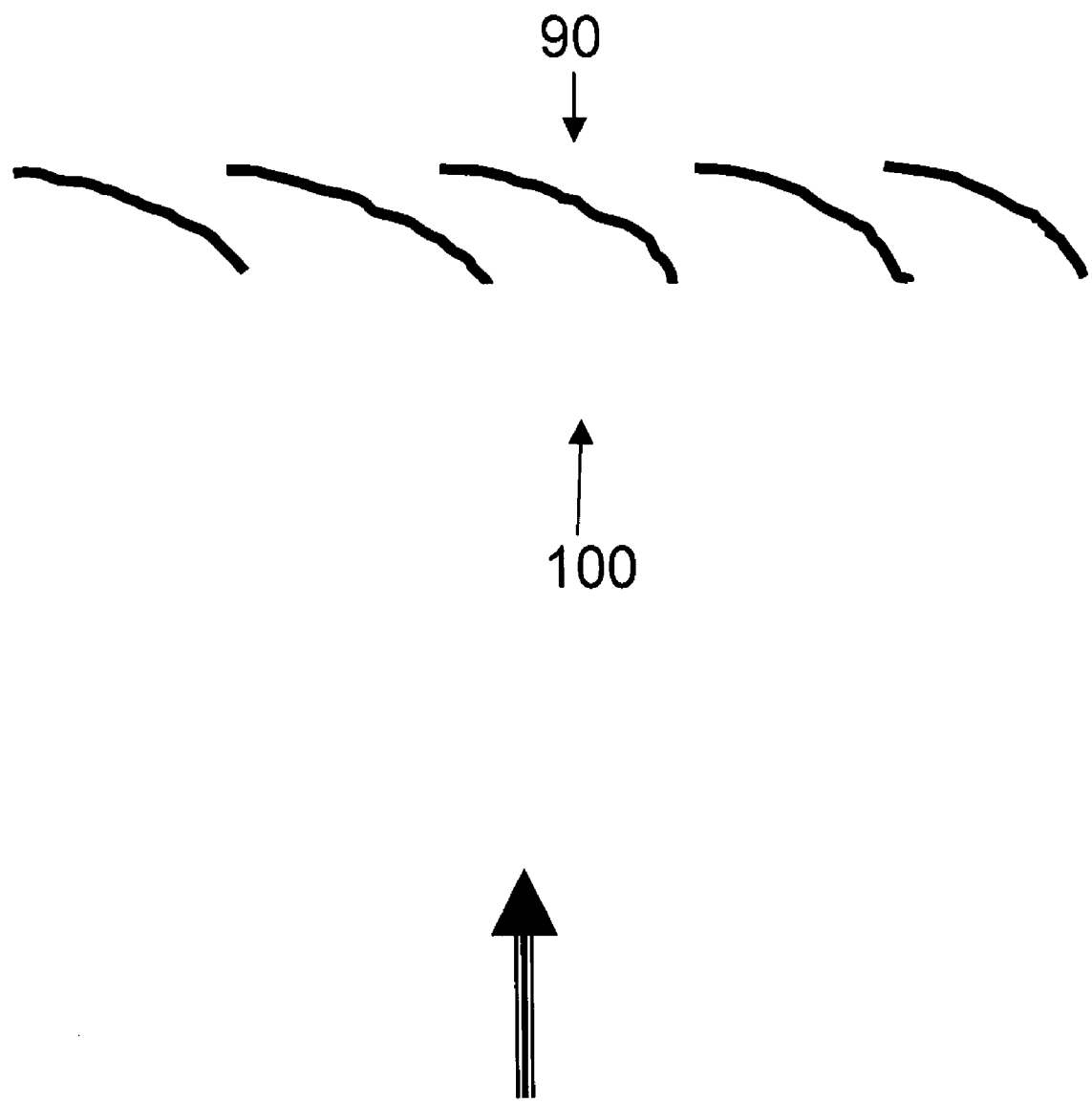
FIG. 7 illustrates convex and concave surfaces of vertical slats of a fabric. (top viewed looking down on the shaped fabric slat edges).

In the construction of the TYPE VS fabric sample, 6¼" wide slats of Nylon (Black) fabric were routinely cut along the machine direction of the roll of fabric supplied. It was noticed that due to the fabric's characteristics, all the slats had a slight curvature. That is they did not lay perfectly flat on the cutting table. This slight curvature of the slats, in an assembled louver configuration, is illustrated in FIG. 5. Lead shot pellet capture tests were conducted of this TYPE VS (louvered) panel with the convex and also the concave side of the panel facing the lead shot projectile. The convex sides (90) and concave sides (100) are shown in FIG. 7.

First, we postulated that in the "closed" (Convex Side) position (less than 10° slat angle), the panel should behave as a "FLAT" surface fabric. This behavior was confirmed since the per cent of total pellets in zone profile for the "closed" TYPE VS (louvered) panel was remarkably similar to the "bounce-back" results obtained for the FLAT Nylon (Black) fabric. The tests were next carried out at a slat angle of about (Convex Side) 35 degrees. As seen in Table 5, the per cent pellet capture close to the fabric (behind and in front of the TYPE VS panel) increased dramatically from 31% (flat) to 50% (35° slats). Tests at a slat angle of (Convex Side) 45 degrees were found to be similar to the 35 degree data. Note however that more pellets were found in the "Back Bin" collection location for the 45° slat angle test. In further tests, a 35° slat angle was selected as being "typical". In view of this, the Concave Side of the panel at a 35° slat angle was lead shot capture evaluated. As observed, at the 75 yard shooting distance, the percent of pellets captured in Zone 1 (closest to the fabric barrier) dramatically increased from 50% to 77%. The increase in close-to-fabric lead drop concentration was also higher (69%) at the 65 yard shooting distance. It is clear that for the TYPE VS lead shot barrier fabric having a concave slat configuration provides a dramatic improvement in lead shot capture/confinement characteristics. These experiments strongly support the idea that "shaped" and louvered fabric surfaces are superior to the flat span/panel fabric in ballistic barrier and lead pellet bounce back characteristics.

EXAMPLE 10

Lead Shot Capture Studies on Double Fabric Layer Panels

A double layer panel assembly, as illustrated in FIG. 1, was created. There was a twelve inch space between the fabric at the top corners of the fabrics, and a two inch space between the fabrics at the bottom corners of the fabrics. The overall double panel test area was approximately 5 feet×5 feet to comply with the test procedure described in Example 6.

Testing was performed as in Example 6 (steps 12-20) except to the extent described herein.

It is observed that the double layered lead shot curtain functions as a very simple and effective way of collecting lead pellets from the shooting range. The collection bin is placed at the bottom of the space between the two approximately parallel fabrics. It completely replaces the need to involve fabric ground cover fabric which has been tried as a lead capture system. The means of collecting the spent lead pellets is very simple. The "captured" lead pellets fall to the ground in a confined area such that a collection trough can be placed under the curtain plies so the lead shot can be directly collected and subsequently recycled.

Table 7 illustrates the amount of lead shot that is deposited into the environment after 5 shots at a target.

TABLE 7

Results of Lead Capture by Double Layered Lead Shot Barrier Curtain Structure[a]

| Hole Size in Front Fabric Layer (Holes were approximately rectangular) | Shooting Distance (yards) | Distance Between Layers (inches) | Number of Hits on Front Fabric Layer | Number of Damage Hits On Front Fabric(b)(c) | Number of Lead Pellets Captured in Trough |
|---|---|---|---|---|---|
| 1.0 × 1.2 mm hole size | 85 | 12 top 2 bottom | 256 | 93? | 230 |
| 2.0 × 2.3 mm hole size | 75 | 12 top 2 bottom | 85 | 85? | 380 |
| 2.0 × 3.5 mm hole size | 75 | 12 top 2 bottom | 90 | 90? | 414 |

[a]The front fabric was Polymax ® black, monofilament polyethylene mesh fabrics obtained from TekSupply, Dyersville, IA 52040. The "back" fabric was Hope Global 100 X4B (nylon warp knit with finish) and suffered no damage from the shootings.
(b)Most of these Damage Hits did not involve monofilament yarn breakage. Mostly, the mesh "screen" was distorted and could be pushed back into the pattern by hand. The yarns were distorted as "loops" that pulled out of the mesh fabric.
(c)"?" signifies uncertainty in the reported number. Distortions may sometime occur in the knit loop without actual breakage in yarn or filament.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A knitted fabric comprising:
    a fabric manufactured with the following settings and conditions on a 36 gauge Raschel-type warp knitting machine:
        Half (½) set Guide Bar 1: 2-0/4-6;
        Half (½) set Guide Bar 2: 4-6/2-0;
        Half (½) set Guide Bar 3: 8-10/2-0;
        Half (½) set Guide Bar 4: 2-0/8-10;
        18 ends per side Guide Bar 5: 0-0/4/4 for selvedges; and
    a polymeric resin coating substantially all of the fabric.

2. The knitted fabric of claim 1, wherein the resin-coated knitted fabric has a pore size of between 0.51 mm$^2$ to 1.45 mm$^2$.

3. The knitted fabric of claim 1, wherein the knitted fabric comprises between 15 courses per inch and 25 courses per inch.

4. The knitted fabric of claim 1, wherein the knitted fabric has an areal weight of between 186 g/m$^2$ and 226 g/m$^2$.

5. The knitted fabric of claim 1, wherein the polymeric resin coating has a weight above about 5% and below about 25% of the weight of the fabric.

6. The knitted fabric of claim 5, wherein the polymeric resin coating has a weight between about 10% and about 20% of the weight of the fabric.

7. The knitted fabric of claim 1, wherein the knitted fabric is formed by stretching a fabric above about 5% but less than about 25% in width and above about 1% and below about 7% in length and heat-setting the fabric to the stretched width and length at a temperature between about 160 degrees Centigrade and about 220 degrees Centigrade.

8. The knitted fabric of claim 1, said knitted fabric comprising fibers having a tenacity of about 1 to 10 grams per denier, a breaking elongation of from about 6% to about 40%, and a modulus between about 20 and about 130 grams per denier.

9. The knitted fabric of claim 1, said knitted fabric comprising fibers having a tenacity of about 11 to 35 grams per denier, a breaking elongation of less than about 5%, and a modulus between about 300 and about 4600 grams per denier.

10. The knitted fabric of claim 1, further comprising a repeat unit comprising a first length between 1.2 mm and about 2.2 mm in the wale direction and a second length between 1.3 mm and about 2.0 mm in the course direction.

11. The knitted fabric of claim 1, further comprising louvered, folded or pleated segments.

12. The knitted fabric of claim 1, further comprising:
    a repeat unit comprising a course spacing between about 1.1 mm and about 2.5 mm in the wale direction and a wale spacing between about 1.2 mm and about 2.1 mm in the course direction.

13. The knitted fabric of claim 12, wherein the repeat unit comprises a course spacing between about 1.2 mm and about 2.2 mm and a wale spacing between about 1.3 mm and 2.0 mm.

14. A double layer fabric assembly comprising:
    a support structure;
    a first layer attached to the support structure, the first layer comprising a knitted fabric comprising:
        a fabric manufactured with the following settings and conditions on a 36 gauge Raschel-type warp knitting machine:
            Half (½) set Guide Bar 1: 2-0/4-6;
            Half (½) set Guide Bar 2: 4-6/2-0;
            Half (½) set Guide Bar 3: 8-10/2-0;
            Half (½) set Guide Bar 4: 2-0/8-10;
            18 ends per side Guide Bar 5: 0-0/4/4 for selvedges; and
        a polymeric resin coating substantially all of the fabric;
    a second layer attached to the support structure, the second layer comprising an unfinished mesh fabric comprising multiple holes; and
    anchors attached to the bottom of the first layer and the second layer,
    wherein the first layer and the second layer are supported by the support structure and anchors and separated by at least 0.5 inch measured between one edge of said first layer and one edge of said second layer.

15. The double layer fabric assembly of claim 14, wherein the resin-coated knitted fabric of the first layer has a pore size of between 0.51 mm$^2$ to 1.45 mm$^2$.

16. The double layer fabric assembly of claim 14, wherein the unfinished mesh fabric comprises monofilament industrial grade polypropylene fiber filaments.

17. The double layer fabric assembly of claim 14, wherein each of the holes of the unfinished mesh fabric of the second layer include a first side between about 1.8 mm and about 2.1 mm, and a second side between about 2.3 mm and about 3.8 mm.

18. The double layer fabric assembly of claim 14, wherein the knitted fabric of the first layer has a weight of between 150 g/m² and 400 g/m².

19. The double layer fabric assembly of claim 14, wherein the knitted fabric of the first layer has a weight of between 186 g/m² and 226 g/m².

20. The double layer fabric assembly of claim 14, wherein the knitted fabric of the first layer comprises a repeat unit comprising a first length between 1.1 mm and about 2.5 mm in the wale direction and a second length between 1.2 mm and about 2.1 mm in the course direction.

21. The double layer fabric assembly of claim 14, wherein the knitted fabric of the first layer comprises louvered, folded or pleated segments.

22. A double layer fabric assembly comprising:
  a support structure;
  a first layer attached to the support structure, the first layer comprising a knitted fabric comprising:
    a fabric manufactured with the following settings and conditions on a 36 gauge Raschel-type warp knitting machine:
      Half (½) set Guide Bar 1: 2-0/4-6;
      Half (½) set Guide Bar 2: 4-6/2-0;
      Half (½) set Guide Bar 3: 8-10/2-0;
      Half (½) set Guide Bar 4: 2-0/8-10;
      18 ends per side Guide Bar 5: 0-0/4/4 for selvedges; and
    a polymeric resin coating substantially all of the fabric;
  a second layer attached to the support structure, the second layer comprising an unfinished mesh fabric comprising multiple holes; and
  anchors attached to the bottom of the first layer and the second layer,
  wherein the first layer and the second layer are supported by the support structure and anchors,
  wherein a top edge of first layer and a top edge of the second layer are attached to the support structure, there is a twelve-inch space between the top edge of the first layer and the top edge of the second layer, and there is a two-inch space between the bottom of the first layer and the bottom of the second layer.

* * * * *